Aug. 17, 1954     I. S. GARMAN     2,686,494
ANIMAL RACK AND TROUGH STRUCTURE
Filed Jan. 7, 1952     2 Sheets-Sheet 1

INVENTOR.
Ivan S. Garman
BY Arthur H. Sturges
Attorney

INVENTOR.
Ivan S. Garman
BY Arthur H. Sturges
Attorney

Patented Aug. 17, 1954

2,686,494

UNITED STATES PATENT OFFICE 2,686,494

ANIMAL RACK AND TROUGH STRUCTURE

Ivan S. Garman, Coffeyville, Kans.

Application January 7, 1952, Serial No. 265,274

1 Claim. (Cl. 119—58)

This invention relates to animal feeders such as used for feeding hay and the like to cattle, and in particular a portable rectangular-shaped frame having a covered V-shaped hay retaining hopper or crib therein and provided with a basin or trough below the crib for catching leaves and small particles dropping from the hay as it is drawn from the crib by the cattle.

The purpose of this invention is to provide a hay rick in the form of a feeding crib wherein all of the hay therein is protected from the elements and is accessible to cattle feeding therefrom so that substantially all waste is eliminated.

Various types of hay ricks have been used on farms and the like for preventing cattle and other stock damaging hay and other feed, however, in the conventional form of feeder there is considerable waste because leaves and other small particles of the hay drop to the ground and are spoiled by the feet of the stock. Also in the conventional form of feeding rack or rick it is difficult to reach all of the hay in the bottom of the rick.

With this thought in mind this invention contemplates a hay retaining crib having sloping sides and a cover formed with hinged sections, with the sides converging to a point at the bottom, and with a supporting frame mounted on skids and having a catch-all basin or trough also supported by the frame and positioned to catch leaves and the like dropping from the crib.

The object of this invention is, therefore, to provide means for forming a covered stock feeding crib which is easily refillable and whereby all hay in the crib is readily accessible to the stock and also wherein all leaves and other particles dropping from the crib are caught and retained in a feeding position.

Another object of the invention is to provide a portable stock feeder, particularly adapted for feeding hay, in which the hay is protected from the weather by a hinged roof and in which means is provided for retaining sections of the roof in upwardly extended or open positions.

A further object of the invention is to provide means for attaching skids to a portable stock feeder whereby the feeder may readily be moved from one position to another.

A still further object of the invention is to provide a covered portable stock feeder, which is readily refillable, in which all feed therein is accessible to stock and in which substantially all waste is eliminated, which is of a simple and economical construction.

With these and other objects and advantages in view the invention embodies a frame having four corner posts mounted on skids, a V-shaped crib, the side walls of which are formed with spaced vertically disposed ribs, roof sections hinged to the upper edges of the side walls, means for retaining the roof sections in upwardly extended positions, a gate hinged to one end of the crib, and a trough extended longitudinally through the frame and positioned below the crib.

Other features and advantages of the invention will appear from the following description taken in connection with the drawings, wherein.

Figure 1:
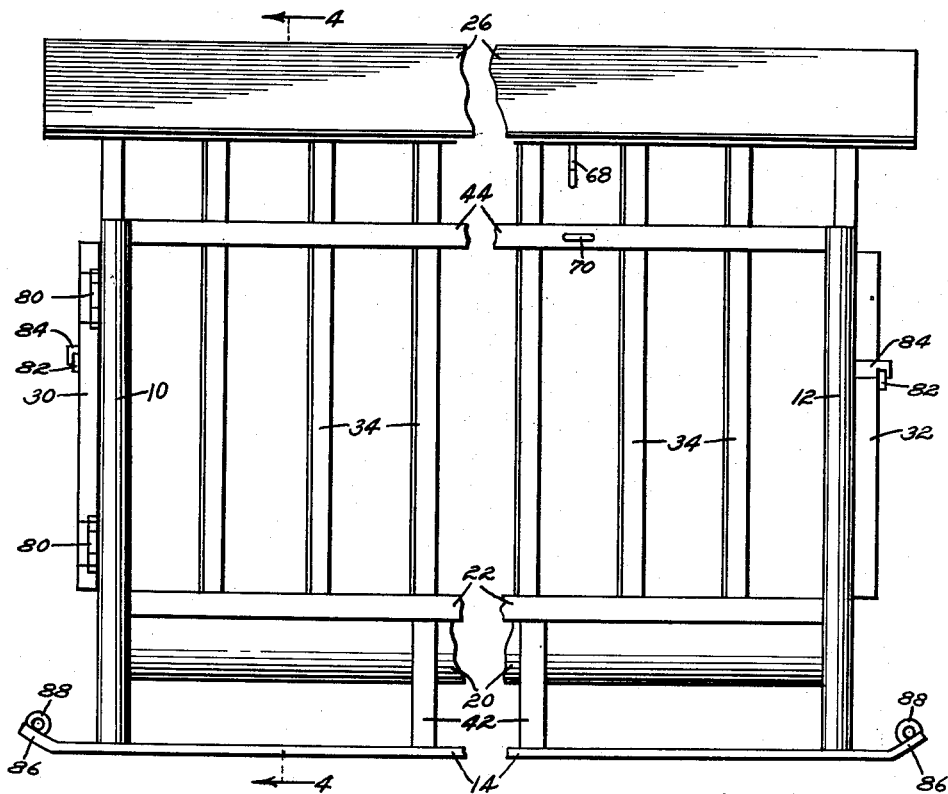
Figure 1 is a side elevational view of the improved feeder with the intermediate part thereof broken away.
Figure 2:
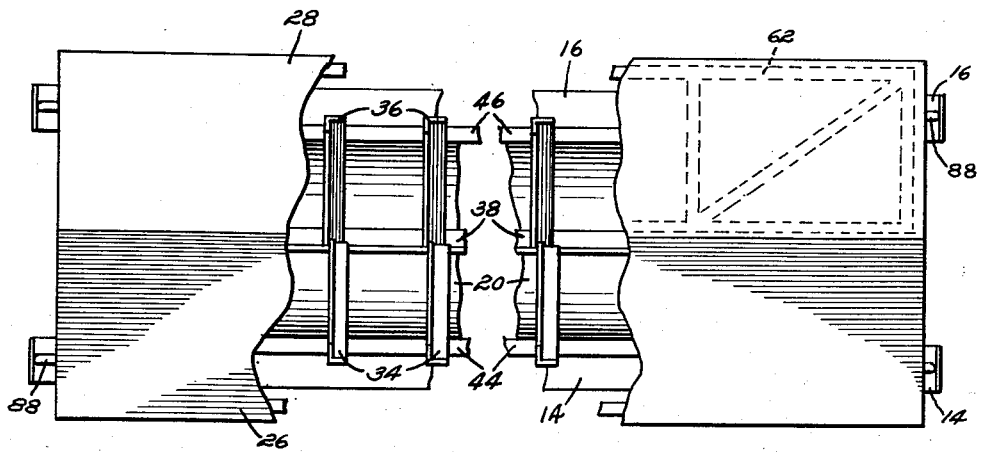
Figure 2 is a plan view of the feeder also with the intermediate part broken away.

Referring now to the drawings wherein like reference characters denote corresponding parts the improved stock feeder of this invention includes a frame having corner posts 10 at one end and similar posts 12 at the opposite end with the posts mounted on skids 14 and 16, a crib generally indicated by the numeral 18, a trough 20 suspended between side rails 22 and 24, which are mounted on the posts, roof sections 26 and 28 positioned on the upper end of the crib and adapted to be retained in upwardly extended positions, and gates 30 and 32, hinged to the ends of the crib.

Figures 3, 4:
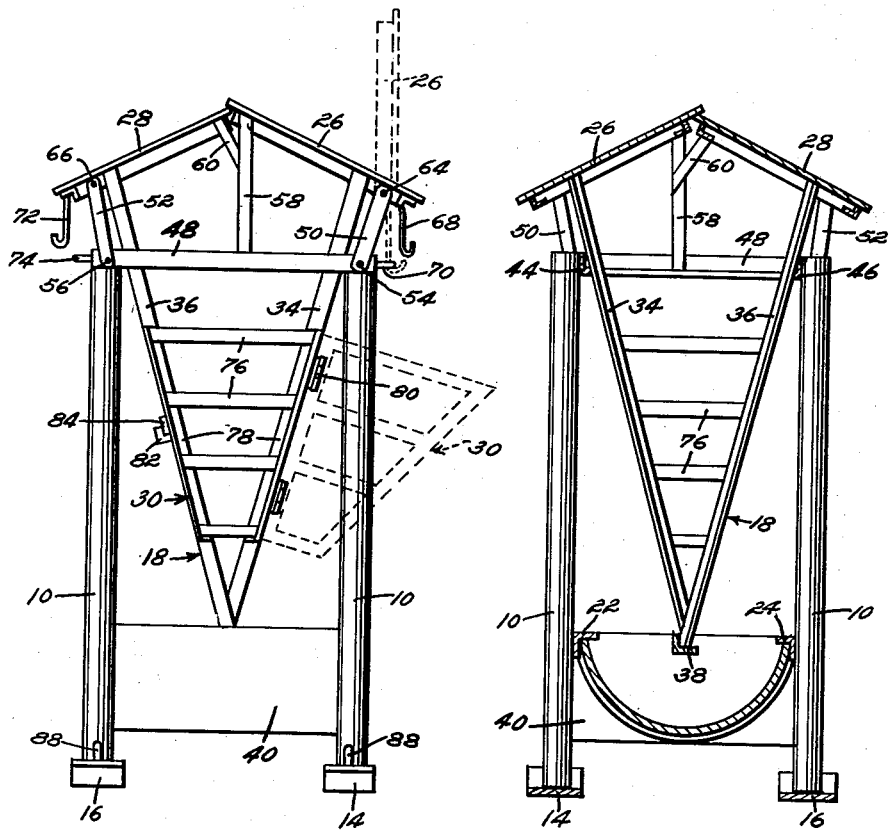
Figure 3 is an end elevational view of the feeder, showing the gate at one end of the crib in the open position in dotted lines.
Figure 4 is a cross section through the feeder taken on line 4—4 of Figure 1.

The side walls of the crib 18 are formed with spaced vertically positioned ribs 34 at one side and 36 at the other, and the lower ends of the ribs are secured in a longitudinally disposed intermediate rail 38, which is mounted between end plates 40 that extend between the corner posts 10 and 12. The ends of the trough 20 are also secured to the end plates 40, as shown in Figure 4, and the rails 22 and 24 are reinforced with intermediate struts 42 that extend to the skids 14 and 16.

The upper ends of the ribs 34 and 36 are supported by upper rails 44 and 46, the ends of which are secured to the upper ends of the corner posts, and the corner posts are also connected with transversely disposed rails 48 upon which links 50 and 52 for supporting the roof sections are mounted with bolts 54 and 56. The rails 48 are also provided with supports 58 having Y-braces 60 on the upper ends, and the supports are positioned to hold the upper edge of the roof section 26 with the upper edge of the section 28 resting upon the braces 60.

The roof sections are provided with truss formations, as indicated by the dotted lines 62, and the trusses of the section 26 are pivotally attached to the upper ends of the links 50 with bolts 64. The trusses of the section 28 are similarly attached to the links 52 with bolts 66.

The roof section 26 is provided with a depending hook 68 which is positioned to coact with an eye 70 on the upper rail 44 for holding the section upwardly, as shown by the dotted lines, and a similar hook 72 depends from the section 28 to coact with an eye 74 on the upper rail 46 for holding this section upwardly. The roof sections may, therefore, be retained in upwardly extended positions to facilitate cleaning and refilling the crib.

The gates 30 and 32 are provided with horizontally disposed bars 76 mounted on vertically positioned struts 78, and the struts at one of the sides thereof are pivotally connected to one of the ribs at the ends of the crib with hinges 80. The opposite sides of the gates are held by latches formed with hooks 82 and bars 84, or fasteners of any suitable type may be used.

The skids 14 and 16 are formed with upwardly extended ends, as indicated by the numeral 86, and eyes 88 are provided on the ends to facilitate attaching the feeder to a tractor or the like for moving the feeder from one position to another.

With the parts assembled in this manner the feeder is positioned whereby stock may feed from both of the sides and ends and with the roof sections extended upwardly the V-shaped crib is filled with hay or the like. After the crib is filled the roof sections are lowered to the closed positions and the cattle or other stock draw the feed through the vertically disposed ribs at the sides and also through the bars at the ends. As the small particles and particularly leaves, such as from alfalfa hay, drop they are caught in the feed trough below the crib so that they are not trampled by the stock and may readily be eaten.

The trough may also be used for feeding dry feed or grain such as oats and corn, in which case the feed is placed directly in the trough.

With the gates at the ends and hinged roof sections the feeder may be refilled from either the ends or top as may be desired.

From the foregoing description it is thought to be obvious that a stock feeder constructed in accordance with my invention is particularly well adapted for use by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

What is claimed is:

In a feed protector, the combination which comprises a cover for use on a rectangular-shaped frame having a V-shaped hay retaining crib suspended above a longitudinally disposed trough and having side walls including spaced vertically disposed ribs connected at their upper ends to upper rails and the ends of the rails being connected with transverse rails, upwardly disposed links pivotally connected to the transverse rails and spaced from the ends thereof, upwardly disposed supports having Y-braces on the upper ends mounted on the intermediate parts of the transverse rails, an upwardly inclined roof section positioned on each side of said frame with the upper edges resting upon the upper ends of the supports and upper ends of the Y-braces, respectively, means for pivotally connecting the lower edges of the roof sections to the upper ends of said links, eyes on said upper rails, and hooks depending from the roof sections and positioned to coact with said eyes for retaining the roof sections in upwardly extended or open positions for refilling the crib.

References Cited in the file of this patent

UNITED STATES PATENTS

| Number | Name | Date |
| --- | --- | --- |
| 56,024 | Every | July 3, 1866 |
| 329,029 | Dye | Oct. 27, 1885 |
| 472,971 | Anderson | Apr. 19, 1892 |
| 1,175,650 | McCollough | Mar. 14, 1916 |
| 2,500,889 | Winkler | Mar. 14, 1950 |

FOREIGN PATENTS

| Number | Country | Date |
| --- | --- | --- |
| 28,006 | Great Britain | A. D. 1909 |